US011986016B2

(12) United States Patent
Mironov et al.

(10) Patent No.: US 11,986,016 B2
(45) Date of Patent: May 21, 2024

(54) INDUCTIVE HEATING ASSEMBLY FOR AEROSOL GENERATION COMPRISING A SUSCEPTOR ELEMENT AND A LIQUID RETENTION ELEMENT

(71) Applicant: Philip Morris Products S.A., Neuchatel (CH)

(72) Inventors: Oleg Mironov, Neuchatel (CH); Jerome Christian Courbat, Neuchatel (CH); Enrico Stura, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 805 days.

(21) Appl. No.: 17/045,583

(22) PCT Filed: Apr. 23, 2019

(86) PCT No.: PCT/EP2019/060357
§ 371 (c)(1),
(2) Date: Oct. 6, 2020

(87) PCT Pub. No.: WO2019/206900
PCT Pub. Date: Oct. 31, 2019

(65) Prior Publication Data

US 2021/0360974 A1 Nov. 25, 2021

(30) Foreign Application Priority Data

Apr. 24, 2018 (EP) .................................... 18168900

(51) Int. Cl.
*A24F 40/465* (2020.01)
*A24F 40/10* (2020.01)
(Continued)

(52) U.S. Cl.
CPC ............ *A24F 40/465* (2020.01); *A24F 40/42* (2020.01); *A24F 40/44* (2020.01); *H05B 6/105* (2013.01); *H05B 6/36* (2013.01); *A24F 40/10* (2020.01)

(58) Field of Classification Search
None
See application file for complete search history.

(56) References Cited

U.S. PATENT DOCUMENTS 6,803,550 B2 10/2004 Sharpe et al.
2016/0120221 A1 5/2016 Mironov et al.
(Continued)

FOREIGN PATENT DOCUMENTS

CN 104470387 A 3/2015
CN 106455715 A 2/2017
(Continued)

OTHER PUBLICATIONS

Machine Translation of KR 10-2017-0007267, WIPO, [online],retrieved frfom the Internet,retrieved Mar. 7, 2024,URL: https://patentscope.wipo.int/search/en/detail.jsf?docId=KR201449372&_cid=P11-LTHECE-17378-1 (Year: 2024).*
(Continued)

*Primary Examiner* — Dennis R Cordray
(74) *Attorney, Agent, or Firm* — Oblon, McClelland, Maier & Neustadt, L.L.P.

(57) ABSTRACT

An inductive heating assembly is provided for generating an aerosol from an aerosol-forming liquid, the assembly including: a ring-shaped liquid retention element configured to hold and to transport the aerosol-forming liquid; and a ring-shaped susceptor element coaxially arranged at an axial end face of the ring-shaped liquid retention element and being configured to heat the aerosol-forming liquid within the ring-shaped liquid retention element, the ring-shaped
(Continued)

susceptor element including an inductively heatable susceptor material exclusively confined within an inner ring portion having an outer radial extension of at most 50 percent of an outer radial extension of the ring-shaped liquid retention element. An aerosol-generating article including the inductive heating assembly is also provided.

15 Claims, 5 Drawing Sheets

(51) Int. Cl.

| | |
|---|---|
| ***A24F 40/42*** | (2020.01) |
| ***A24F 40/44*** | (2020.01) |
| ***H05B 6/10*** | (2006.01) |
| ***H05B 6/36*** | (2006.01) |

(56) References Cited

U.S. PATENT DOCUMENTS

| | | | | |
|---|---|---|---|---|
| 2017/0105452 | A1 | 4/2017 | Mironov et al. | |
| 2017/0347715 | A1 | 12/2017 | Mironov et al. | |
| 2018/0184712 | A1 | 7/2018 | Fraser et al. | |
| 2019/0142066 | A1 | 5/2019 | Gill et al. | |
| 2019/0208827 | A1* | 7/2019 | Mironov | A24F 40/20 |

FOREIGN PATENT DOCUMENTS

| | | | |
|---|---|---|---|
| CN | 107105780 | A | 8/2017 |
| CN | 107708452 | A | 2/2018 |
| CN | 107708453 | A | 2/2018 |
| EA | 013046 | B1 | 2/2010 |
| EP | 3 110 270 | A1 | 1/2017 |
| JP | 2016-524458 | A | 8/2016 |
| JP | 2017-515486 | A | 6/2017 |
| KR | 10-2017-0007267 | | 1/2017 |
| RU | 2 605 837 | C2 | 12/2016 |
| RU | 2 643 968 | C2 | 2/2018 |
| WO | WO 2015/131058 | A1 | 9/2015 |
| WO | WO 2015/177044 | A1 | 11/2015 |
| WO | WO 2015/177046 | A1 | 11/2015 |
| WO | WO 2017/001818 | A1 | 1/2017 |
| WO | WO 2017/001820 | A1 | 1/2017 |
| WO | WO 2017/191176 | A1 | 11/2017 |
| WO | WO 2018/050701 | A1 | 3/2018 |

OTHER PUBLICATIONS

Extended European Search Report dated Oct. 10, 2018 in European Patent Application No. 181689001, citing documents AB, AC, and AQ therein, 6 pages International Search Report and Written Opinion dated Aug. 14, 2019 in PCT/EP2019/060357 filed on Apr. 23, 2019.

Japanese Office Action dated Mar. 6, 2023 in Japanese Patent Application No. 2020-558535 (with English translation), citing documents 15-18 therein, 8 pages.

Combined Russian Office Action and Search Report dated Aug. 4, 2022, in corresponding Russian Patent Application No. 020134015 (with English Translation) citing documents 15-17 therein, 11 pages.

Combined Chinese Office Action and Search Report dated Oct. 26, 2023 in Chinese Patent Application No. 2019800254969 (with Engiish Translation), citing references 15-19 therein, 8 pages.

Korean Office Action mailed on Jan. 10, 2024 issued in South Korean Patent Application No. 10-2020-7029888 filed on Apr. 23, 2019, with English Translation, total 15 pages (citing document 15, therein).

* cited by examiner

INDUCTIVE HEATING ASSEMBLY FOR AEROSOL GENERATION COMPRISING A SUSCEPTOR ELEMENT AND A LIQUID RETENTION ELEMENT

The present invention relates to an inductive heating assembly for generating an aerosol from an aerosol-forming liquid comprising a susceptor element and a liquid retention element. The invention further relates to an aerosol-generating article comprising such an inductive heating assembly.

Aerosol-generating systems based on induction heating of aerosol-forming liquids are generally known from prior art. These systems comprise an induction source generating an alternating electromagnetic field for inducing heat generating eddy currents and/or hysteresis losses in a susceptor element. The susceptor element is in thermal proximity of the aerosol-forming liquid which is capable of releasing volatile compounds upon heating. The susceptor element and the aerosol-forming liquid may be provided together in an aerosol-generating article. The article is configured for use with an aerosol-generating device which in turn may include the induction source. The article may further comprise a liquid retention element for holding and transporting aerosol-forming liquid from a reservoir within the article towards the susceptor element. The retention element is in thermal contact with or proximity of the susceptor element such that liquid retained therein is heated and thus vaporized. However, it has been observed that heating of the aerosol-forming liquid within the retention element often does not provide the expected quantity of vaporized liquid during a single puff. Furthermore, undesirable altering effects of the liquid properties, for example altering effects of the aerosol flavor occurring over the consumption period of the article, are observed.

Therefore, it would be desirable to have a heating assembly for aerosol generation comprising a susceptor element and a liquid retention element with the advantages of prior art solutions but without their limitations. In particular, a heating assembly would be desirable which has a simple design easy to manufacture and which provides a reproducible quantity of vaporized aerosol-forming liquid during a single puff.

According to a first aspect of the invention there is provided an inductive heating assembly for generating an aerosol from an aerosol-forming liquid. The assembly comprises a ring-shaped liquid retention element for holding and transporting aerosol-forming liquid. The assembly further comprises a ring-shaped susceptor element coaxially arranged at an axial end face of the retention element for heating aerosol-forming liquid within the retention element. The susceptor element comprises an inductively heatable susceptor material exclusively confined within an inner ring portion of the ring-shaped susceptor element. The inner ring portion has an outer radial extension of at most 50 percent of an outer radial extension of the retention element.

According to the invention it has been recognized that heating aerosol-forming liquid within the retention element may generate bubbles which in turn may adversely affect the capillary liquid transport through the retention element. By confining the inductively heatable susceptor material to an inner ring portion of the susceptor element that is smaller in the radial direction than the ring-shaped retention element, the present invention advantageously achieves a reduction of the effectively heated volume of the retention element, that is, a local confinement of the heating process. Due to this only local heating of the radial inner portion of the retention element, the above described adverse effects are significantly reduced. As a consequence, the quantity of vaporized aerosol-forming liquid becomes highly reproducible.

Confining the heating process to an inner ring portion of the retention element furthermore proves advantageous because the aerosol-forming liquid is vaporized where it can be directly released from the retention element. As a result, possibly generated bubbles are directly released and, thus, cannot perturb the capillary liquid transport through the retention element. Preferably, aerosol-forming liquid vaporized within the inner ring portion of the retention element is directly released into a central airflow passage that is formed through the central inner void of the coaxially aligned ring-shaped retention element and susceptor element. This is particularly advantageous as the aerosol distribution within the retention element is higher in the vicinity of the central airflow passage than in other parts of the retention element that are further away from the central airflow passage. Advantageously, the locally vaporized aerosol-forming liquid may be released through a radial inner face of the retention element that is exposed at least partially to the central airflow passage. Due to this, vaporized aerosol-forming liquid may be entrained in the air flowing in the airflow passage such as to subsequently cool down to form an aerosol.

Furthermore, it has been recognized that excessive heat propagation from the susceptor element and/or the heated liquid retention element into other parts of the heating assembly may cause severe problems. In particular, it has been recognized that excessive heat propagation into a liquid reservoir—containing aerosol-forming liquid to be vaporized and for this reason being in fluid communication with the liquid retention element—may cause the above described altering effects of the aerosol-forming liquid. Accordingly, a locally confined heating advantageously facilitates prevention of such altering effects.

Yet further, a confined local heating permits to reduce power consumption of the heating assembly. This proves advantageous with regard to the fact that inductive heating assemblies used in aerosol-generating devices—like those according to the present invention—are typically powered by batteries which only have a limited energy capacity.

Preferably, the inner ring portion has an outer radial extension of at most 40 percent, in particular of at most 30 percent, even more preferably of at most 20 percent, most preferably of at most 10 percent of an outer radial extension of the retention element. Advantageously, by further reducing the outer radial extension of the inner ring portion the above described adverse effects are further minimized.

The ring-shaped susceptor element according to the first aspect of the invention may only comprise, in particular consist of the inner ring portion comprising the inductively heatable susceptor material. In this case, the overall outer radial extension of the ring-shaped susceptor element is smaller than the overall outer radial extension of the ring-shaped retention element. Advantageously, this provides a compact and material saving design of the heating assembly. In this configuration, the ring-shaped retention element preferably is made of solid material such as to ensure sufficient stability.

Alternatively, the susceptor element may comprise an outer ring portion around the inner ring portion, wherein the outer ring portion exclusively may contain inductively non-heatable material and/or thermally insulating material. Advantageously, this configuration provides thermal insulation of other parts from the heated inner ring portion. In this configuration, the overall outer radial extension of the ring-shaped susceptor element preferably is equal to or even larger than the overall outer radial extension of the ring-shaped retention. In particular, this configuration allows the ring-shaped susceptor element to form a support and/or a sealing element for the ring-shaped retention element. Even more, this configuration allows the ring-shaped susceptor element to form a portion of a housing of a liquid reservoir used for storing aerosol-forming liquid to be vaporized. Yet further, this configuration provides a very compact design of the heating assembly having a high mechanical stability.

According to a second aspect of the invention, there is provided another inductive heating assembly for generating an aerosol from an aerosol-forming liquid. The assembly according to this aspect also comprises a ring-shaped liquid retention element for holding and transporting aerosol-forming liquid and a ring-shaped susceptor element coaxially arranged at an axial end face of the retention element for heating aerosol-forming liquid within the retention element. According to the second aspect of the invention, the assembly further comprises an induction coil arranged proximal to an axial end face of the susceptor element opposite to the retention element. The induction coil is configured for generating an alternating electromagnetic field within the susceptor element. Furthermore, the induction coil has an outer radial extension of at most 50 percent of an outer radial extension of the retention element and/or of an outer radial extension of the susceptor element. Preferably, the induction coil has an outer radial extension of at most 40 percent, in particular of at most 30 percent, even more preferably of at most 20 percent, most preferably of at most 10 percent of an outer radial extension of the retention element and/or of an outer radial extension of the susceptor element. For example, the outer radial extension of the induction coil may be between 3 mm (millimeter) and 6 mm (millimeter), preferably between 4 mm (millimeter) and 5 mm (millimeter).

Advantageously, the heating assembly according to the second aspect of the invention also achieves a local confinement of the heating process within the ring-shaped retention element, thus allowing to minimize the above described adverse effects. Here, local confinement of the heating process is achieved by reducing the effective flow volume of the electromagnetic field through the susceptor element (rather than by confining the inductively heatable susceptor material to an inner ring portion of the susceptor element that is smaller in the radial direction than the ring-shaped retention element) and thus by reducing the effectively heated volume of the susceptor element.

In addition, confining the radial extension of the induction coil also proves advantageous with regard to a compact design of the heating assembly. In addition, reducing the effective flow volume of the electromagnetic field through the susceptor element reduces power consumption. Likewise, confining the radial extension of the induction coil also facilitates prevention of altering effects of the aerosol-forming liquid as described above with regard to the first aspect of the invention.

In the heating assembly according to the second aspect of the invention, the ring-shaped susceptor element may have the same or even a larger outer radial extension as compared to the outer radial extension of the ring-shaped liquid retention element. In this configuration, due to the confined outer radial extension of the induction coil, only an inner ring portion of the susceptor element is heated, whereas an outer ring portion of the susceptor element is too far away from the induction coil to be sufficiently heated above a threshold for vaporizing aerosol-forming liquid retained therein. This is particularly true when the susceptor element is intermittently heated, for example on a puff basis. In any case, this reduces bubble generation in the outer ring portion. The outer ring portion of the susceptor element—which is not heated—may advantageously serve as support and/or a sealing element covering the liquid retention element such as to prevent leakage of aerosol-forming liquid, as described above with regard to the first aspect invention.

Of course, the heating assembly according to the first aspect may also comprise an induction coil arranged proximal to an axial end face of the susceptor element opposite to the retention element. In particular, this induction coil may also have an outer radial extension of at most 50 percent, in particular of at most 40 percent, preferably of at most 30 percent, even more preferably of at most 20 percent, most preferably of at most 10 percent of an outer radial extension of the retention element and/or of an outer radial extension of the susceptor element.

Vice versa, the heating assembly according to the second aspect may also include a susceptor element which comprises an inductively heatable material exclusively confined within an inner ring portion having an outer radial extension of at most 50 percent, in particular of at most 40 percent, preferably of at most 30 percent, even more preferably of at most 20 percent, most preferably of at most 10 percent of an outer radial extension of the liquid retention element.

Further features and advantages of the heating assemblies according to both aspects of invention will be described below in common.

With regard to both aspects of the invention, the induction coil may be integral part of an aerosol-generating article which comprises a heating assembly according to one of the first or second aspect. Alternatively, the induction coil may be integral part of an aerosol-generating device. The aerosol-generating device is configured for use with an aerosol-generating article which preferably comprises the other parts of the heating assembly (apart from the induction coil), that is, at least the ring-shaped retention element and the ring-shaped susceptor element. Of course, at least one of the ring-shaped retention element and the ring-shaped susceptor element may be also integral part of an aerosol-generating device.

Further with regard to both aspects of invention, the induction coil may have a shape matching the shape of the respective portion of the susceptor element to be heated. Preferably, the induction coil is a helical coil or a flat pancake coil (flat spiral coil). The induction coil may be wound around a ferrite core. As used herein, the terms "pancake coil" or a "flat spiral coil" refer to a coil that is a generally planar coil, wherein the axis of winding of the coil is normal to the surface in which the coil lies. The flat spiral induction can have any desired shape within the plane of the coil. For example, the flat spiral coil may have a circular shape or a generally oblong or rectangular shape. Furthermore, the flat spiral coil may comprise for example two layers of a four-turn pancake coil or a single layer of four-turn pancake coil. Use of a flat spiral coil allows for compact design that is robust and inexpensive to manufacture. Use of a helical induction coil advantageously allows for generating a homogeneous alternating electromagnetic field.

The induction coil can be held within a housing of the heating assembly, or a housing of an aerosol-generating article, or a main body or a housing of an aerosol-generating device. Preferably, the induction coil does not need to be exposed to the generated aerosol. Thus, deposits on the coil and possible corrosion can be prevented. In particular, the induction coil may comprise a protective cover or layer.

As used herein, the terms “radial”, “axial” and “coaxial” refer to a center axis of the heating assembly. This center axis may be a symmetry axis the ring-shaped retention element and the susceptor element. Accordingly, as used herein, the terms inner and outer radial extension refer to an extension measured from the center axis of the heating assembly. For example, the outer radial extension of the susceptor element, the retention element or the induction coil refers to the radial distance between the center axis and a radial outermost edge of the susceptor element or of the induction coil, respectively. Likewise, the inner radial extension of the susceptor element, the retention element or the induction coil refers to the radial distance between the center axis and a radial innermost edge of the susceptor element or of the induction coil, respectively.

As used in, the terms “ring-shaped”, “ring shape” and “ring” refers to a circular or a circumferentially closed geometric body comprising a central inner void around a center axis. The outer radial extension of the ring or ring shape preferably is larger than the axial extension of the ring or ring shape. That is, the ring or ring shape preferably is flat. Of course, the outer radial extension of the ring or ring shape may be also smaller than the axial extension of the ring or ring shape.

As herein, the terms “susceptor material” or “inductively heatable susceptor material” refer to a material that is capable to convert electromagnetic energy into heat. Thus, when located in an alternating electromagnetic field, the susceptor is heated. In general, this may be the result of hysteresis losses and/or eddy currents induced in the susceptor, depending on the electrical and magnetic properties of the susceptor material. Hysteresis losses occur in ferromagnetic or ferrimagnetic susceptor materials due to magnetic domains within the material being switched under the influence of an alternating electromagnetic field. Eddy currents are induced if the susceptor material is electrically conductive. In case of an electrically conductive ferromagnetic or ferrimagnetic susceptor material, heat can be generated due to both, eddy currents and hysteresis losses.

Preferably, the susceptor is a metal susceptor. For example, the susceptor may comprise ferritic iron, or a paramagnetic or ferromagnetic metal or metal alloy, such as aluminium or ferromagnetic steel, in particular ferromagnetic stainless steel. The susceptor may also comprise or may be made of austenitic steel, austenitic stainless steel, graphite, molybdenum, silicon carbide, niobium, Inconel alloys (austenite nickel-chromium-based super-alloys), metallized films, ceramics such as for example a ferrimagnetic ceramic material or zirconia, transition metals such as for example Fe, Co, Ni, or metalloids components such as for example B, C, Si, P, Al.

As used herein, the term “aerosol-forming liquid” relates to a liquid capable of releasing volatile compounds that can form an aerosol upon heating the aerosol-forming liquid. The aerosol-forming liquid may contain both, solid and liquid aerosol-forming material or components. The aerosol-forming liquid may comprise a tobacco-containing material containing volatile tobacco flavor compounds, which are released from the liquid upon heating. Alternatively or additionally, the aerosol-forming liquid may comprise a non-tobacco material. The aerosol-forming liquid may further comprise an aerosol former. Examples of suitable aerosol formers are glycerine and propylene glycol. The aerosol-forming liquid may also comprise other additives and ingredients, such as nicotine or flavourants. In particular, the aerosol-forming liquid may include water, solvents, ethanol, plant extracts and natural or artificial flavors. The aerosol-forming liquid may also be a paste-like material, a sachet of porous material comprising aerosol-forming substrate, or, for example, loose tobacco mixed with a gelling agent or sticky agent, which could include a common aerosol former such as glycerine, and then is compressed or molded into a plug.

As used herein, the term “liquid retention element” refers to a transporting and storage medium for aerosol-forming liquid. Thus, aerosol-forming liquid stored in the liquid retention element may be easily transferred to the susceptor element, for example by capillary action. To ensure sufficient vaporization of the aerosol-forming liquid, the liquid retention element advantageously is in direct contact to or at least in close proximity with the susceptor element.

Preferably, the liquid retention element comprises or consists of capillary material. Even more preferably, the liquid retention element may comprise or consist of a high retention or high release material (HRM) for holding and transporting aerosol-forming liquid. Furthermore, the liquid retention element may be at least one of electrically non-conductive and paramagnetic or diamagnetic. Even more preferably, the liquid retention element is inductively non-heatable. Thus, the liquid retention element advantageously is unaffected or only minimally affected by the alternating electromagnetic field used for inducing heat generating eddy currents and/or hysteresis losses in the susceptor element. The liquid retention element may generally comprise or consist of a material configured to withstand at least the vaporization temperature of the aerosol-forming liquid. The vaporization temperature of the aerosol-forming liquid may be in the range of 220° C. to 240° C. For example, the liquid retention element may comprise or consist of glass fiber, cotton or Kevlar.

In general and further with regard to both aspects of the invention, an outer radial extension of the ring-shaped susceptor element preferably is equal to or larger than an outer radial extension of the ring-shaped liquid retention element. Likewise, an inner radial extension of the ring-shaped susceptor element preferably is equal to or smaller than inner radial extension of the ring-shaped liquid retention element. Preferably, the inner radial extension of the ring-shaped susceptor element is (in particular only slightly) smaller than the inner radial extension of the liquid retention element. This particular configuration facilitates formation of a meniscus of aerosol-forming liquid about the transition area between the liquid retention element and the inwardly protruding susceptor element, in particular between the radial inner faces of the susceptor element and the retention element. Advantageously, the meniscus provides a constant but steady volume of aerosol-forming liquid to be vaporized, thus causing the quantity of vaporized liquid to be highly reproducible.

In case the inner and outer radial extensions of the susceptor element are of the order of the inner and outer radial extension of the liquid retention element, the ring-shaped susceptor element advantageously serves as support and/or sealing element for the retention element. Advantageously, this provides high mechanical stability and prevents leakage of aerosol-forming liquid.

Of course, an outer radial extension of the susceptor element may also be smaller than an outer radial extension of the liquid retention element. Likewise, an inner radial extension of the susceptor element may be larger than inner radial extension of the liquid retention element.

Advantageously, the ring-shaped susceptor element is toroidal and/or hollow cylindrical. Preferably, the ring-shaped susceptor element is toroidal and hollow cylindrical.

That is, the ring-shaped susceptor element may be a revolution body resulting from a revolution of a rectangle around an axis of revolution, thus forming a solid body having a central hole or central passage along the axis of revolution. The height of the revolving rectangle determines the thickness of the ring-shaped susceptor element. The distance between the axis of revolution and the inner edge of the revolving rectangle determines the inner radial extension of the ring-shaped susceptor element. The distance between the outer edge of the revolving rectangle, that is, the sum of the inner radial extension and the length of the revolving rectangle as measured in the radial direction with regard to the axis of revolution, determines the outer radial extension of the ring-shaped susceptor element. In particular, the ring-shaped susceptor element may have, for example, a washer shape.

Preferably, the ring-shaped liquid retention element is also toroidal and/or hollow cylindrical. In particular, the inner radial extension of the susceptor element may be the same as the inner radial extension of the ring-shaped susceptor element. In this configuration, the design of the heating assembly is particularly compact.

In general, the thickness or height of the ring-shaped liquid retention element may be equal to or larger than or smaller than the thickness or height of the ring-shaped susceptor element. Preferably, the height of the ring-shaped liquid retention element is chosen such that a radial inner face of the retention element is large enough to release a sufficient amount of vaporized aerosol-forming liquid.

With regard to both aspects of the present invention, the heating assembly may also comprise a liquid reservoir for holding aerosol-forming liquid. Advantageously, the combination of the liquid reservoir, the liquid retention element and the susceptor element may readily form a main component of an aerosol-generating article to be used with an aerosol-generating device. Such a configuration is compact, easy to manufacture as including only a small number of parts.

As described above with regard to the susceptor element and the liquid retention element, the liquid reservoir may be also toroidal and/or hollow cylindrical. Advantageously, any one of the aforementioned features supports a very compact and symmetric design.

Preferably, the reservoir is also ring-shaped with regard to the ring shape of the susceptor element and the liquid retention element. In particular, the reservoir may comprise a ring-shaped outer wall and a ring-shaped outer wall surrounding the inner wall at a distance such as to form a ring-shaped or hollow cylindrical reservoir therebetween for storing aerosol-forming liquid. Preferably, the ring-shaped outer wall forms a central air passage extending through the reservoir along a center axis of the heating assembly. The central air passage may be tubular, in particular cylindrical. Preferably, the radius of the central air passage corresponds to the inner radial extension of the ring-shaped liquid retention element and/or of the inner radial extension of the ring-shaped susceptor element. For example, at least one of the inner radial extension of the ring-shaped susceptor element, the inner radial extension of the ring-shaped liquid retention element or the inner radius of the central air passage may be between 2 mm (millimeter) and 10 mm (millimeter), preferably between 4 mm (millimeter) and 5 mm (millimeter).

Furthermore, the radius of the central air passage preferably is smaller than inner radial extension of the ring portion of the susceptor element where heating occurs, that is, the location where the alternating magnetic field of the induction coil preferably is strongest. The center of this ring portion is approximately given by the mean radial extension of the induction coil. The mean radial extension of the induction coil is given by averaging over the inner and outer radial extensions of the induction coil, that is, by the sum of the inner and outer radial extensions of the induction coil divided by two. Hence, the inner radial extension of the susceptor element preferably is between the inner radial extension and the mean radial extension of the induction coil.

Preferably, the reservoir comprises or is made of an inductively non-heatable, in particular electrically non-conductive and paramagnetic or diamagnetic material. Even more preferably, the reservoir comprises or is made of a thermally insulting material. Advantageously, this prevents undesired overheating of the aerosol-forming liquid and/or burn hazards.

Furthermore, the liquid retention element preferably is arranged at least partially within the reservoir. In particular, a radial inner face of the retention element may be exposed at least partially to the central air passage. Advantageously, this facilitates a direct release of vaporized aerosol-forming liquid into the central air passage. As described above, a direct release of vaporized aerosol-forming liquid prevent prevents undesired bubble generation within the liquid retention element and also within the liquid that is stored within the liquid reservoir.

Further with regard to both aspects of the invention, the reservoir may be open at an axial end face. That is, the reservoir may have an opening at an axial end face. Preferably, the opening of the axial end face is ring-shaped. Accordingly, the ring-shaped liquid retention element may be advantageously arranged in this ring-shaped opening, thus allowing the liquid retention element to be in direct contact with aerosol-forming liquid contained in the reservoir.

Yet, the ring-shaped liquid retention element does not necessarily provide a sealing of the opening of the liquid reservoir due to its capillary properties. Therefore, the ring-shaped susceptor element preferably provides a cover or sealing element for the liquid retention element, as already described above. For this, the ring-shaped susceptor element may be arranged at the opening at the axial end face. Even more preferably, the ring-shaped susceptor element may form at least partially an axial end face of the reservoir. In particular, the axial end face of the reservoir formed by the susceptor element may extend between the radial-inner portion and a radial-outer portion of the wall of the liquid reservoir. The latter configuration proves particularly advantageous with regard to the mechanical stability of the liquid reservoir. In order to ensure proper mounting of the susceptor element to the liquid reservoir a radial outer face of the susceptor element and/or and a radial outer face of the retention element may be recessed in an outer wall of the reservoir.

Furthermore, one or more seals, for example sealing gaskets, may be provided about the contact/mounting area of the wall(s) of the liquid reservoir and the susceptor element. This further improves the leak tightness of the liquid reservoir.

In general, sealing of the liquid retention element may be provided as follows: The liquid retention element may be fully sealed on its radial outer face, that is, the part farthest away from the central air passage, by of the liquid reservoir or joining the liquid reservoir and the susceptor. In particular, the joining external wall may be considered a continuation of an outer wall of the liquid reservoir, or may be another part of the heating assembly, or of an aerosol-generating device for of an aerosol-generating article. The liquid retention element may be fully sealed by the susceptor at one of its axial end faces. Furthermore, the liquid retention element may be partially or not sealed, that is, exposed, at radial inner face.

According to the invention there is also provided an aerosol-generating article for use with an aerosol-generating device. The article comprises an inductive heating assembly according to the first or the second aspect of the invention. That is, the aerosol-generating article either comprises a heating assembly having a susceptor element that comprises an inductively heatable susceptor material exclusively confined within an inner ring portion having an outer radial extension of at most 50 percent of an outer radial extension of the retention element. Alternatively, the aerosol-generating article comprises a heating assembly having an induction coil arranged proximal to an axial end face of the susceptor element opposite to the retention element for generating an alternating electromagnetic field within the susceptor element, wherein the induction coil has an outer radial extension of at most 50 percent of an outer radial extension of the retention element and/or of an outer radial extension of the susceptor element.

As used in, the term "aerosol-generating article" refers to an article configured for use with an aerosol-generating device, in particular configured to be received within a receiving cavity of an aerosol-generating device. The aerosol-generating article may be a cartridge to be inserted into an aerosol-generating device. The aerosol-generating article may be a consumable, in particular a consumable to be discarded after a single use.

Preferably, the aerosol-generating article comprises a liquid reservoir that is part of the heating assembly and as described above with regard to the heating assembly according to both aspects of invention.

Furthermore, the aerosol-generating article may comprise a mouthpiece. Preferably, the mouthpiece includes an outlet in fluid communication with a central air passage formed by the central void of the ring-shaped liquid retention element, susceptor element and the liquid reservoir (if present). Even more preferably, the mouthpiece may be integral with a liquid reservoir. In particular, the mouthpiece may be a proximal end portion of the liquid reservoir, preferably a tapered end portion of the liquid reservoir. This proves advantageous with regard to very compact sign of the aerosol-generating article. The liquid reservoir may also form a housing or outer shell of the article. The article according to this configuration may be inserted into a receiving cavity or attached to a proximal end portion aerosol-generating device. For attaching the aerosol-generating article to an aerosol-generating device, a distal end portion of the aerosol-generating device may comprise a magnetic or mechanical mount, for example a bayonet mount or a snap-fit mount, which engages with a corresponding counterpart at a proximal end portion of the aerosol-generating device.

Alternatively, the aerosol-generating article may only comprise the ring-shaped susceptor element, the ring-shaped liquid retention element and a liquid reservoir. The article according to this configuration may be readily prepared for insertion into a receiving cavity of aerosol-generating device. A proximal open end of the receiving cavity (used for insertion of the article) may be closed by a mouthpiece which belongs to the aerosol-generating device. Alternatively, the aerosol-generating article may be attached to a main body of the aerosol-generating device and received in a cavity formed by a mouthpiece of the aerosol-generating device upon mounting the mouthpiece to the main body.

In either one of these configurations, when the article is inserted or attached to the device, the central airflow passage formed by the central void of the ring-shaped liquid retention element, susceptor element and the liquid reservoir (if present) preferably is in fluid communication with an air path extending through the aerosol-generating device. Preferably, the device comprises an air path extending from the at least one air inlet through the receiving cavity (if present) to at least one air outlet, for example to air outlet in the mouthpiece (if present).

As described above, the induction coil preferably is part of the aerosol-generating device. This facilitates powering of the induction coil. Yet, as also described above, the induction coil may be integral part of the aerosol-generating article. In this configuration, the induction coil preferably comprises a connector to be electrically connected to an induction source of an aerosol-generating device. The connector is configured such that it automatically engages with a corresponding connector of the aerosol-generating device up on coupling the aerosol-generating article the aerosol-generating device.

As mentioned before, it is the aerosol-generating device which preferably comprises an induction source for powering the induction coil. The induction source may comprise an alternating current (AC) generator. The AC generator may be powered by a power supply of the aerosol-generating device. The AC generator is operatively coupled to the induction coil. The AC generator is configured to generate a high frequency oscillating current to be passed through the induction coil for generating an alternating electromagnetic field. As used herein, a high frequency oscillating current means an oscillating current having a frequency between 500 kHz and 30 MHz, preferably between 1 MHz and 10 MHz and more preferably between 5 MHz and 7 MHz.

The device may further comprise an electric circuitry which preferably includes the AC generator. The electric circuitry may advantageously comprise a DC/AC inverter, which may include a Class-D or Class-E power amplifier. The electric circuitry may be connected to an electrical power supply of the aerosol-generating device. The electric circuitry may comprise a microprocessor, which may be a programmable microprocessor, a microcontroller, or an application specific integrated chip (ASIC) or other electronic circuitry capable of providing control. The electric circuitry may comprise further electronic components. The electric circuitry may be configured to regulate a supply of current to the induction coil. Current may be supplied to the induction coil continuously following activation of the system or may be supplied intermittently, such as on a puff by puff basis.

As also mentioned before, the aerosol-generating device advantageously comprises a power supply, preferably a battery such as a lithium iron phosphate battery. As an alternative, the power supply may be another form of charge storage device such as a capacitor. The power supply may require recharging and may have a capacity that allows for the storage of enough energy for one or more user experiences. For example, the power supply may have sufficient capacity to allow for the continuous generation of aerosol for a period of around six minutes or for a period that is a multiple of six minutes. In another example, the power supply may have sufficient capacity to allow for a predetermined number of puffs or discrete activations of the induction coil.

Further features and advantages of the aerosol-generating article according to the invention have been described with regard to heating assemblies according to both aspects according to the invention and as described herein. Therefore, these further features and advantages of the aerosol-generating article will not be repeated.

According to the invention there is also provided aerosol-generating device. The device comprises an inductive heating assembly according to one of the first or the second aspect of the invention. In particular, the device may be configured for use with an aerosol-generating article containing aerosol-forming liquid to be vaporized.

Further features and advantages of the aerosol-generating device according to the invention have been described with regard to heating assemblies according to both aspects of the invention and as described herein, as well as with regard to the aerosol-generating article according to the invention and this herein. Therefore, these further features and advantages of the aerosol-generating device will not be repeated.

The invention will be further described, by way of example only, with reference to the accompanying drawings, in which.

Figure 5:
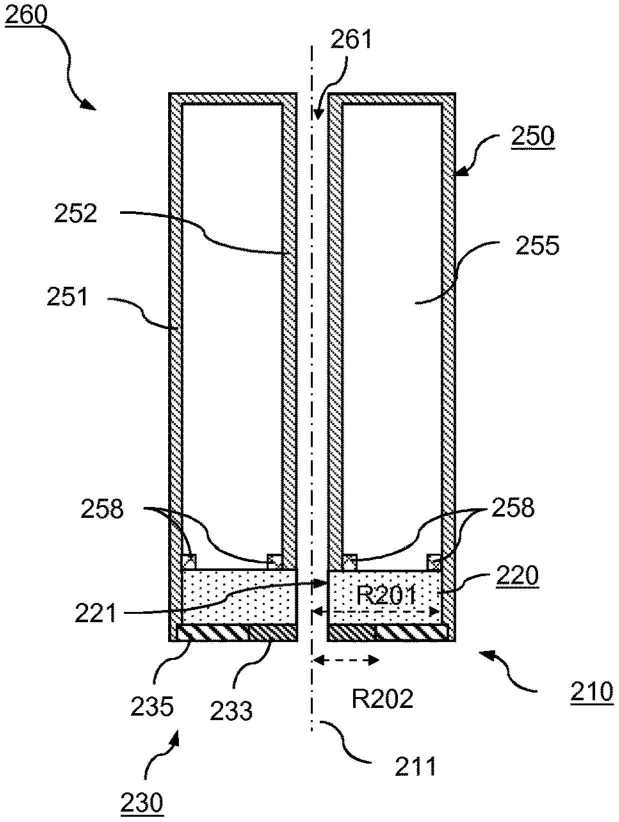
FIG. 5 is a schematic cross-sectional view of yet another exemplary embodiment of an aerosol-generating article comprising an inductive heating assembly according to a third embodiment of the invention.
Figure 6:
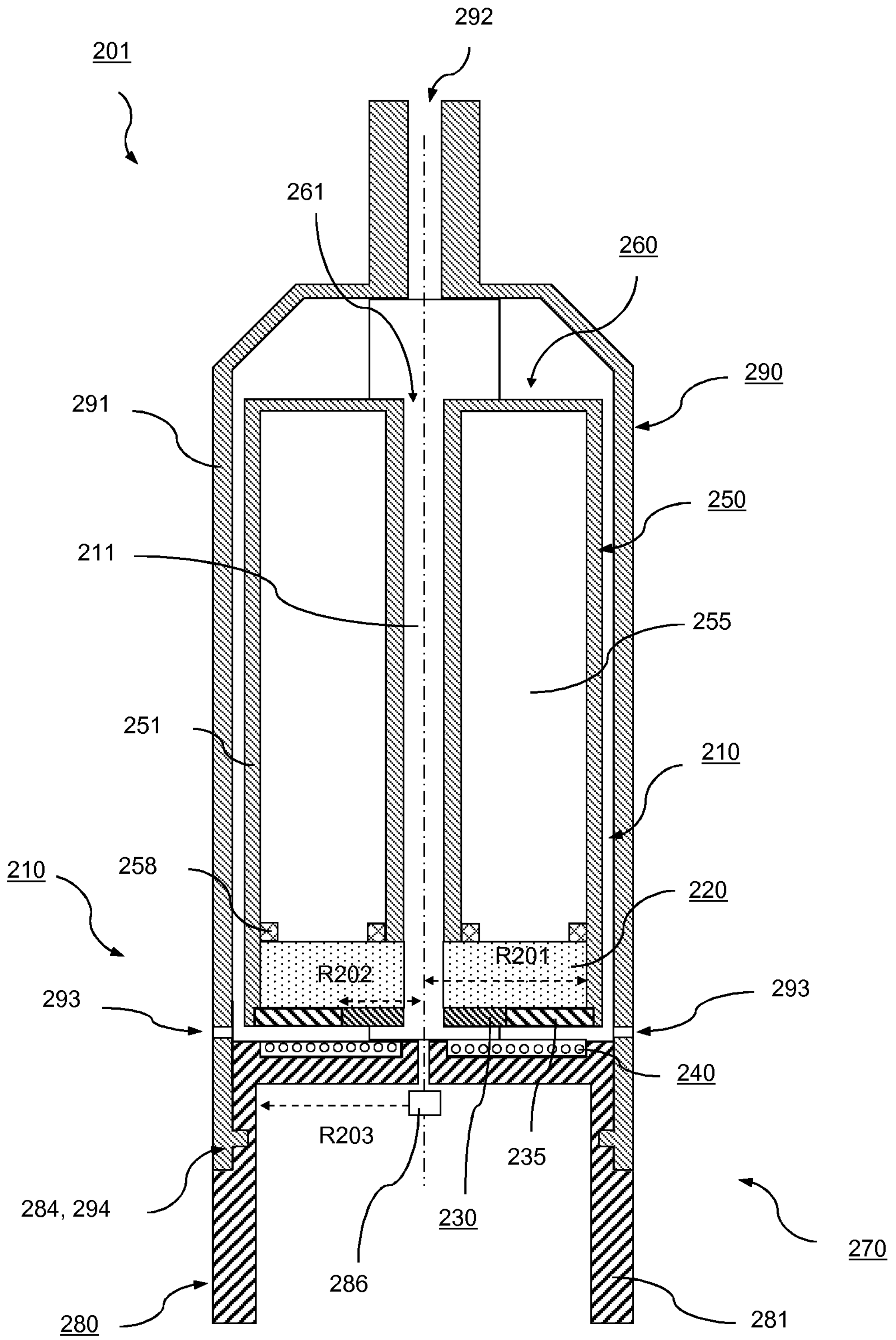
Figure 7:
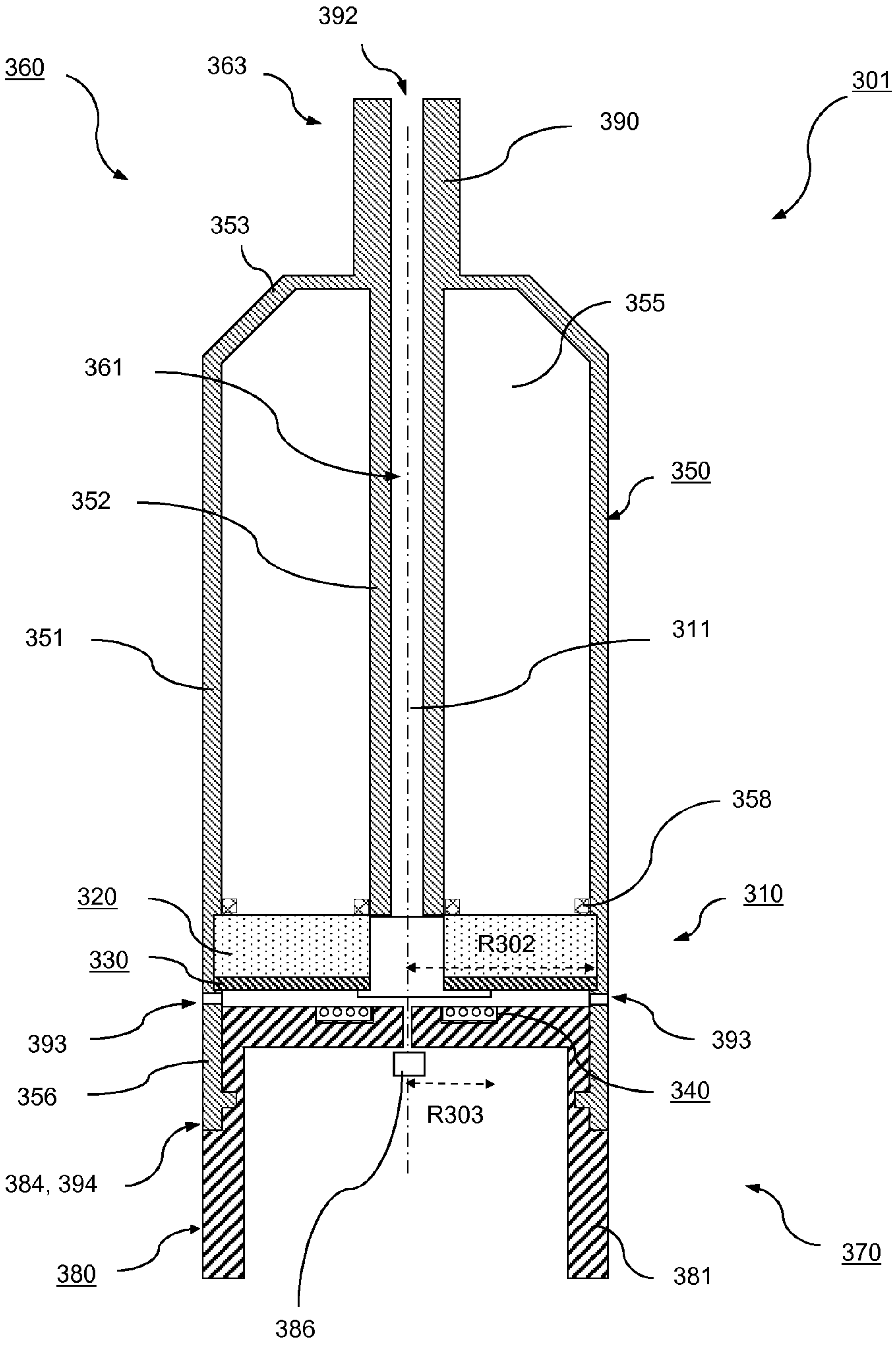

FIG. 6 is a schematic cross-sectional view of another exemplary embodiment of an aerosol-generating system comprising an aerosol-generating device and the aerosol-generating article according to FIG. 5; and FIG. 7 is a schematic cross-sectional view of another exemplary embodiment of an aerosol-generating system comprising an aerosol-generating device and an aerosol-generating article according to a fourth embodiment of the invention.

Figure 1:
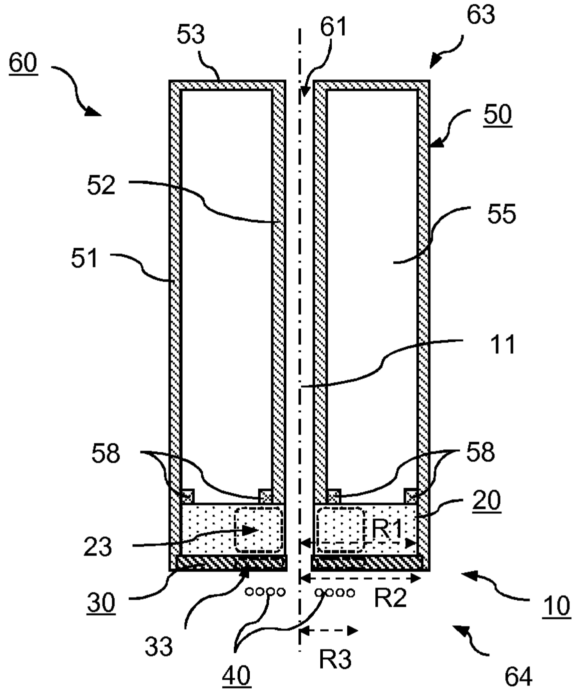
FIG. 1 is a schematic cross-sectional view of an exemplary embodiment of an aerosol-generating article comprising an inductive heating assembly according to a first embodiment of the invention.
Figure 2:
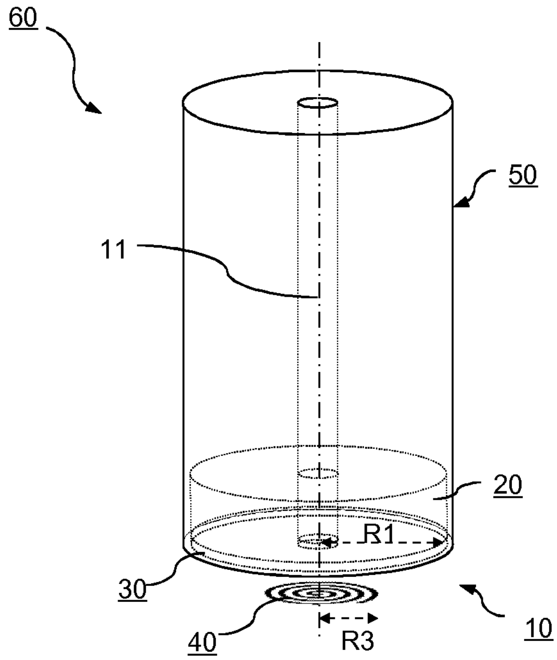
FIG. 2 is a schematic perspective view of the aerosol-generating article according to FIG. 1.

FIG. 1 and FIG. 2 schematically illustrate a first embodiment of an aerosol-generating article 60 comprising (at least partially) an inductive heating assembly 10 according to the second aspect of the invention.

Figure 3:
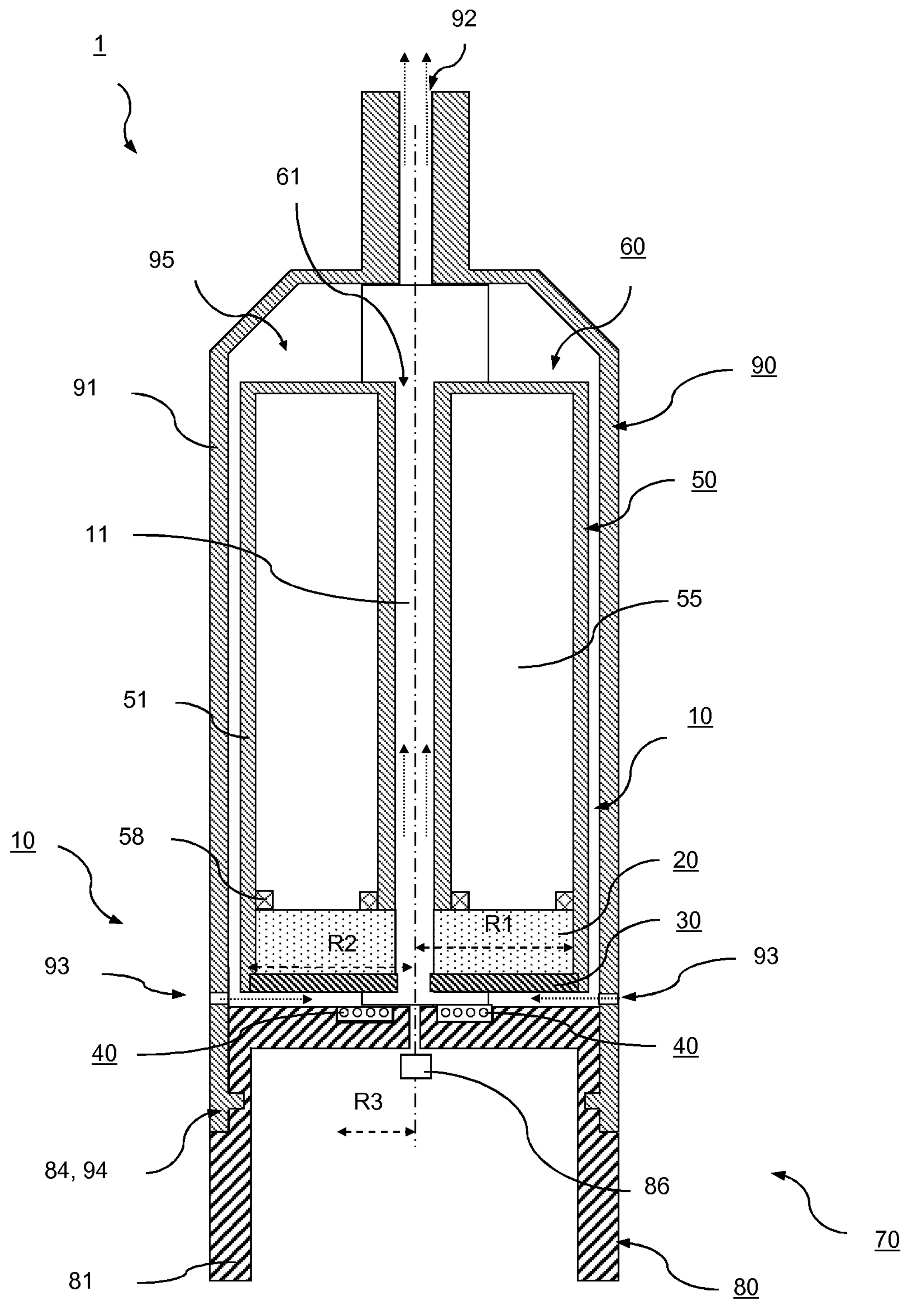
FIG. 3 is a schematic cross-sectional view of an exemplary embodiment of an aerosol-generating system comprising an aerosol-generating device and the aerosol-generating article according to FIG. 1.

As illustrated in FIG. 3 the aerosol-generating article 60 is configured for use with an aerosol-generating device 70, wherein the device 70 and the article 60 together form an aerosol-generating system 1. The aerosol-generating article 60 or the heating assembly 10, respectively, includes a liquid reservoir 15 for holding aerosol-forming liquid to be vaporized using the heating assembly 10. In the present embodiment, the reservoir 15 has a substantially hollow cylindrical shape formed by a ring-shaped outer wall 51, a ring-shaped inner wall 52 and a proximal end wall 53 at the proximal end of the article 60. The ring-shaped inner wall 52 forms a central air passage 61 through the reservoir 50 extending along a center axis 11 of the heating assembly 10. At the distal end 64 of the article 60, the reservoir 50 has an opening closed by a ring-shaped liquid retention element 20 that is part of the inductive heating assembly 10 according to the present invention. The liquid retention element 20 is configured for holding and transporting aerosol-forming liquid stored in the ring-shaped reservoir volume 55 of the hollow cylindrical reservoir 50. Advantageously, the liquid retention element is in direct contact with aerosol-forming liquid contained in the reservoir 50 due to its arrangement within the opening of the reservoir 50. Preferably, the liquid retention element 20 comprises or even consists of a high retention or high release material (HRM), for example a porous ceramic material.

For heating and vaporizing the aerosol-forming liquid within the retention element 20, the inductive heating assembly according to the first embodiment shown in FIGS. 1-3 further comprises a ring-shaped susceptor element 30 that is coaxially arranged at an axial end face of the liquid retention element 20 opposite to the reservoir volume 55 of the hollow cylindrical liquid reservoir 50. Preferably, the susceptor element 30 is in direct physical and thus thermal contact with the axial end face of the liquid retention element 20. As can be seen from FIGS. 1-3, the ring-shaped susceptor element 30 forms an axial end face of the liquid reservoir 50 and at the same time also provides a sealing cover for the liquid retention element 30 as the latter typically does not provide sufficient sealing of the liquid reservoir due to its capillary properties. In order to further improve leak tightness of the liquid reservoir 50, seals 58 are provided about the contact area between the inner and outer walls 51, 52 of the liquid reservoir 50 and the liquid retention element 20.

In order to ensure proper mounting of the ring-shaped susceptor element 30 to the outer wall 51 of the liquid reservoir 50, a radial outer face of the susceptor element 30 is recessed in the outer wall 51 of the reservoir 50. Accordingly, the outer radial extension R2 of the susceptor element 30 is slightly larger than the outer radial extension R1 of the liquid retention element 20. Advantageously, this provides high mechanical stability of the article 60.

To inductively heated susceptor element 30 and thus to vaporized aerosol-forming liquid within the retention element 20, the heating assembly 10 according to the present embodiment includes an induction coil 40 according to the second aspect of the invention which is configured for generating an alternating electromagnetic field within the susceptor element. The induction coil 40 is arranged proximal to an axial end face of the susceptor element 30 opposite to the liquid retention element 20 at the distal and 64 of the article 60. In general, the induction coil 40 may be either part of the article 60 or—as in the present embodiment shown in FIG. 3—part of the aerosol-generating device 70 which is configured for interaction with the aerosol-generating article 60.

According to the second aspect of the present invention, the induction coil 40 has outer radial extension R3 of at most 50 percent of the outer radial extension R2 of the susceptor element 30 as well as of the outer radial extension R1 of the liquid retention element 20. In the present embodiment, the radial extension R3 of the induction coils 40 is even only about 30 percent of the outer radial extension R2 susceptor element 30. Due to this, the inductive heating process is confined to an inner ring portion 33 (see dashed box in FIG. 1) of the susceptor element 30 having a radial extension roughly corresponding to the radial extension of the induction coil 40. In contrast, the remaining outer ring portion of the susceptor element 30 is too far away from the induction coil 40 to be sufficiently heated above a threshold for vaporizing aerosol-forming liquid retained therein. This is particularly true when the susceptor element is intermittently heated, for example on a puff basis. As a result, the heating process within the ring-shaped liquid retention element 20 is also confined to an inner ring portion 23 (see dashed box in FIG. 1) of the retention element 20. Advantageously, this local confinement reduces the above described adverse effects due to bubble generation and altering of the aerosol-forming liquid in the reservoir volume 55. In addition, a confined local heating reduces power consumption of the heating assembly 10.

As can be particularly seen from FIG. 1, the length extension of the ring-shaped inner wall 52 of the liquid reservoir 50 is shorter than the length extension of the outer wall 51. Due to this, the radial inner face of the liquid retention element 20 is exposed at least partially to the central air passage 61. Advantageously, this facilitates a direct release of vaporized aerosol-forming liquid into the central air passage 61.

As can be further seen from FIG. 1, the inner radial extension of the ring-shaped susceptor element 30 is slightly smaller than the inner radial extension of the liquid retention element 20, thus allowing a meniscus of aerosol-forming liquid to form about the transition area between the liquid retention element 20 and the inwardly protruding susceptor element 30. Advantageously, the meniscus provides a constant but steady volume of aerosol-forming liquid to be vaporized, causing the quantity of vaporized liquid to be highly reproducible.

Preferably, the susceptor element 30 comprises or even is made of a ferromagnetic and electrically conductive material, for example ferromagnetic stainless steel. In contrast, the material of the liquid retention element is inductively non-heatable, in particular electrically non-conductive and paramagnetic or diamagnetic. Advantageously, this prevents undesired overheating of the aerosol-forming liquid.

Referring to FIG. 3, the aerosol-generating article 60 according to the first embodiment is configured for interaction with an aerosol-generating device 70 which comprises the induction coil 40 of the heating assembly 10. In the present embodiment, the induction coil 40 is a flat spiral coil including one layer having four turns of an electrically conductive wire. For powering the induction coil 40, the aerosol-generating device 70 may comprise an induction source (not shown) including an alternating current (AC) generator that is powered by a battery (not shown).

Further with reference to FIG. 3, the aerosol-generating device 70 comprises a main body 80 and a mouthpiece 90. The mouthpiece 90 is releasably attachable to the main body 80. For this, the main body 80 and the mouthpiece 90 comprise corresponding snap-fit mounts 84, 94 that are arranged at opposing ends of the walls 81, 91 of the main body 80 and the mouthpiece 90, respectively.

The mouthpiece 90 defines a cavity 95 for accommodating the aerosol-generating article 60 such as to be securely mounted in the aerosol-generating device 70. Once the aerosol-generating article 20 is attached to the aerosol-generating device 70, the central airflow passage 61 formed by the central void of the ring-shaped liquid retention element 20, the susceptor element 30 and the liquid reservoir 50 is in fluid communication with an air path extending through the aerosol-generating device 70. In the present embodiment, the air path (see dotted arrows in FIG. 3) extends from lateral air inlets 93 in the outer wall 91 of the mouthpiece 90 through the receiving cavity 95 to a central air outlet 92 at the proximal end of the mouthpiece 90.

In use, a user may puff on the mouthpiece 90 to draw air though the air inlets 93 into the cavity 95 and out of the outlet 92 into the user's mouth. The device 70 may include a puff sensor 86 in the form of a microphone for detecting when a user puffs on the mouthpiece. The puff sensor 86 is in fluid communication with the air path and arranged within the main body 80 close to the induction coil 40 and the distal end of central air passage 61. When a puff is detected, the induction source provides a high frequency oscillating current to the coil 40. This generates an oscillating magnetic field which passes through the susceptor element 30. As a consequence, the susceptor element 30 heats up due to hysteresis losses and/or eddy currents, depending on its electrical and magnetic properties, until reaching a temperature sufficient to vaporize the aerosol-forming liquid held in the liquid retention element 20. The vaporized aerosol-forming material is entrained in the air flowing from the air inlets 93 along the central air passage 61 towards the air outlet 92. Along this way, the vapor cools to form an aerosol within the mouthpiece 90 before escaping through the outlet 92. The induction source may be configured to power the induction coil 40 for a predetermined duration, for example five seconds, after detection of a puff and then switches the current off until a new puff is detected.

Figure 4:
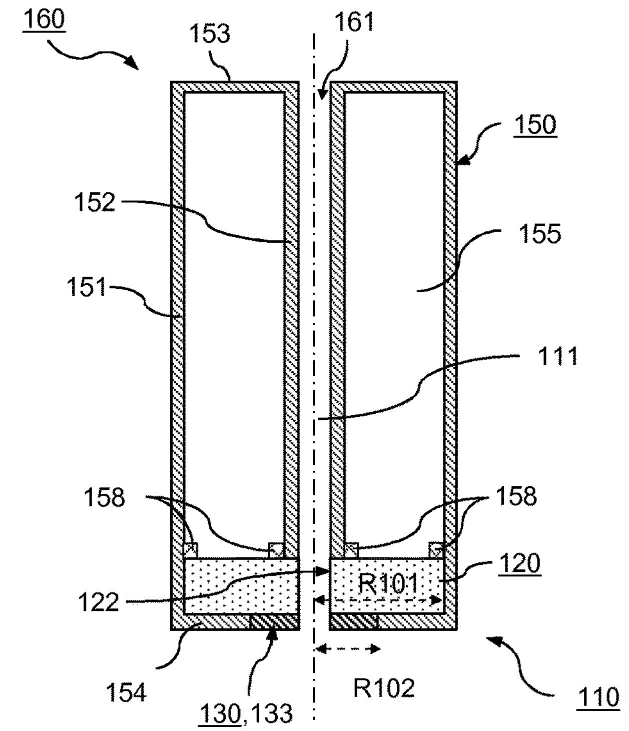
FIG. 4 is a schematic cross-sectional view of another exemplary embodiment of an aerosol-generating article comprising an inductive heating assembly according to a second embodiment of the invention.

FIG. 4 schematically illustrates a second embodiment of an aerosol-generating article 160 comprising a heating assembly 110 according to the first aspect of the present invention. According to this aspect, the ring-shaped susceptor element 130 comprises an inductively heatable susceptor material that is exclusively confined within an inner ring portion 133 having an outer radial extension R102 of at most 50 percent of an outer radial extension R101 of the liquid retention element 120. In the present embodiment, the susceptor element 130 even consists of the inner ring portion 133 only. Moreover, in the embodiment shown in FIG. 4, the outer radial extension R102 of the inner ring portion 133, that is, of the susceptor element 130 is only on the order of 30 percent of the outer radial extension R101 of the liquid retention element 120. Due to this, the heating assembly 110 according to this second embodiment achieves a reduction of the effectively heated volume of the liquid retention element 120, that is, a local confinement the heating process.

As can be further seen in FIG. 4, the ring-shaped susceptor element 130 according to this second embodiment—due to its reduced radial extension as compared to the liquid retention element 120—only forms a portion of the axial end face of the reservoir 150 or the article 160, respectively. The remaining portion of the axial end face is formed by a flat ring-shaped distal end wall 154 of the reservoir 150 having the same thickness as the susceptor element 130. Preferably, the distal end wall 154 is integral with the ring-shaped outer wall 151, the ring-shaped inner wall 152 and the proximal end wall 153 of the reservoir 150. Furthermore, the ring-shaped susceptor element 130 is in direct contact with the distal end wall 154 and attached thereto, for example, by adhesive means such as glue or in press-fitting manner.

Apart from the heating assembly 110, in particular apart from the radially smaller susceptor element 130 and the distal end wall 154, the aerosol-generating article 160 according to the second embodiment shown in FIG. 4 is very similar or even identical to the aerosol-generating article 60 according to the second embodiment shown in FIGS. 1-3. Therefore, like or identical features are denoted with the same reference numerals, incremented by 100.

FIG. 5 schematically illustrates a third embodiment of an aerosol-generating article 260 which also comprise a heating assembly 210 according to the first aspect of the invention.

The aerosol-generating article 260 according to this third embodiment is very similar to the second embodiment shown in FIG. 4. Accordingly, like or identical features are denoted with the same reference numerals as in FIG. 4, incremented by 100. In contrast to the second embodiment shown in FIG. 4, the heating assembly 210 of the aerosol-generating article 260 according to FIG. 5 comprises a ring-shaped susceptor element 230 that forms the entire axial end face of the reservoir 250 and the article 260, respectively. That is, the susceptor element 230 radially extends substantially across the entire liquid retention element 220 and thus provides a sealing cover for the liquid retention element 220, analogous to the susceptor element 30 of the heating assembly 10 according to the first embodiment shown in FIGS. 1-3. Yet, the susceptor element is bipartite including an inner ring portion 233 and an outer ring portion 235 around the inner ring portion 233. According to the first aspect of the invention, the inductively heatable susceptor material of the susceptor element 230 is exclusively confined to the inner ring portion 233. In the present embodiment, the inner ring portion 233 has an outer radial extension R202 of about 30 percent of the outer radial extension R201 of the liquid retention element 220, thus achieving a local confinement of the heating process as described above. In contrast, the outer ring portion 235 exclusively contains inductively non-heatable material, preferably thermally insulating material. Advantageously, this provides thermal insulation of other parts, such as the outer all 251 of the reservoir 250 from the heated inner ring portion 233.

FIG. 6 shows an aerosol-generating system 201 comprising an aerosol-generating article 260 according to FIG. 5 mounted to an aerosol-generating device 270. The latter is very similar to the aerosol-generating device 70 according to FIG. 3. Accordingly, like or identical features of the device 270 are denoted with the same reference numerals as in FIG. 3, yet incremented by 200. In contrast to the device 70 shown in FIG. 3, the device 270 shown in FIG. 6 comprises an induction coil 240 (being part of the heating assembly 210) that has an outer radial extension R203 substantially equal to the outer radial extension R201 of the liquid retention element 220 and the outer radial extension R202 of the susceptor element 230. However, notwithstanding that, the heating process is still locally confinement to an inner ring portion of the retention element 220 due to the inductively heatable susceptor material being exclusively confined within the inner ring portion of the susceptor element 230. For the same reason, the device 270 according to FIG. 6 may be also readily used with the aerosol-generating article 160 according to FIG. 4. Of course, both, the article 160 according to FIG. 4 as well as the article according to FIG. 5 may be used with the aerosol-generating device 70 according to FIG. 3 including an induction coil 40 that has an outer radial extension R3 of at most 50 percent of the outer radial extensions of the retention element and the susceptor element.

FIG. 7 schematically illustrates another exemplary embodiment of an aerosol-generating system 301 comprising an aerosol-generating device 370 and an aerosol-generating article 360 according to a fourth embodiment. The device 370 is very similar to the device 70 according to FIG. 3, in particular with regard to the main bodies 80 and 380, respectively. Therefore, like or identical features are denoted with the same reference numerals as in FIG. 3, incremented by 300. Yet, in contrast to the device 70 according to FIG. 3, the device 370 according to FIG. 7 does not comprise a mouthpiece. Instead, it is the article 360 which comprises a cylindrical mouthpiece portion 390 at its proximal end 363 adjacent to the proximal end wall 353 of the liquid reservoir 350. In particular, the mouthpiece portion 390 is integral with the walls of the liquid reservoir 350. As can be seen in FIG. 7, the central air passage 361 through the void center of the reservoir 350 further extends through the center of the cylindrical mouthpiece portion 390 towards to an air outlet 392. As can be further seen in FIG. 7, the outer wall 351 of the liquid reservoir 350 has a ring-shaped protrusion 356 axially extending beyond the susceptor element 330 in a distal direction. At its distal end, the ring-shaped protrusion 356 comprises a snap-fit mount 394 which engages with a corresponding snap-fit mount 384 arranged at an opposing end of the walls 381 of the main body 380 of the device 370. In addition, the article 360 comprises lateral air inlets 393 extending through the outer wall 351 close to the susceptor element 330. From there, an air path passes along the end face of the susceptor element 330 and the radial inner face of the liquid retention element 320 further through the central air passage 361 towards to the air outlet 392.

Advantageously, the article 360 provides a very compact design. Apart from that, the article 360 is very similar to the article 60 according to FIG. 1-3. In particular, the heating assembly 310 including the liquid retention element 320, the susceptor element 330 and the induction coil 340 is substantially identical to the heating assembly 10 according to FIGS. 1-3.

The invention claimed is:

1. An inductive heating assembly for generating an aerosol from an aerosol-forming liquid, the assembly comprising:

a ring-shaped liquid retention element configured to hold and to transport the aerosol-forming liquid; and a ring-shaped susceptor element coaxially arranged at an axial end face of the ring-shaped liquid retention element and being configured to heat the aerosol-forming liquid within the ring-shaped liquid retention element, wherein the ring-shaped susceptor element comprises an inductively heatable susceptor material exclusively confined within an inner ring portion having an outer radial extension of at most 50 percent of an outer radial extension of the ring-shaped liquid retention element.

2. The inductive heating assembly according to claim 1, wherein the inner ring portion has an outer radial extension of at most 10 percent of an outer radial extension of the ring-shaped liquid retention element.

3. The inductive heating assembly according to claim 1, wherein the ring-shaped susceptor element comprises an outer ring portion around the inner ring portion exclusively containing inductively non-heatable material and/or thermally insulating material.

4. The inductive heating assembly according to claim 1, wherein an outer radial extension of the ring-shaped liquid retention element is equal to or larger than an outer radial extension of the ring-shaped susceptor element, or is smaller than an outer radial extension of the ring-shaped susceptor element.

5. The inductive heating assembly according to claim 1, wherein an inner radial extension of the ring-shaped liquid retention element is equal or larger than an inner radial extension of the ring-shaped susceptor element.

6. The inductive heating assembly according to claim 1, wherein the ring-shaped susceptor element is toroidal and/or hollow cylindrical.

7. The inductive heating assembly according to claim 1, wherein the ring-shaped liquid retention element is toroidal and/or hollow cylindrical.

8. The inductive heating assembly according to claim 1, the inductive heating assembly having a center axis, the inductive heating assembly further comprising a liquid reservoir configured to hold the aerosol-forming liquid, the liquid reservoir having a ring-shaped inner wall, wherein the ring-shaped inner wall of the liquid reservoir forms a central air passage through the liquid reservoir extending along the center axis of the inductive heating assembly, wherein the ring-shaped liquid retention element is disposed at least partially within the liquid reservoir, and wherein the ring-shaped liquid retention element has a radial inner face, and the radial inner face of the ring-shaped liquid retention element is exposed at least partially to the central air passage.

9. The inductive heating assembly according to claim 8, wherein the ring-shaped susceptor element forms at least partially an axial end face of the liquid reservoir.

10. The inductive heating assembly according to claim 8, wherein a radial outer face of the ring-shaped susceptor element and/or a radial outer face of the ring-shaped liquid retention element is recessed in an outer wall of the liquid reservoir.

11. The inductive heating assembly according to claim 8, wherein the liquid reservoir is toroidal and/or hollow cylindrical.

12. An aerosol-generating article for an aerosol-generating device, the aerosol-generating article comprising an inductive heating assembly according to claim 1.

13. An inductive heating assembly for generating an aerosol from an aerosol-forming liquid, the assembly comprising:

a ring-shaped liquid retention element configured to hold and to transport aerosol-forming liquid;

a ring-shaped susceptor element coaxially arranged at an axial end face of the ring-shaped liquid retention element and being configured to heat the aerosol-forming liquid within the ring-shaped liquid retention element; and an induction coil disposed proximal to an axial end face of the ring-shaped susceptor element opposite to the ring-shaped liquid retention element and being configured to generate an alternating electromagnetic field within the ring-shaped susceptor element, wherein the induction coil has an outer radial extension of at most 50 percent of an outer radial extension of the ring-shaped liquid retention element and/or of an outer radial extension of the ring-shaped susceptor element.

14. The inductive heating assembly according to claim 13, wherein the induction coil has an outer radial extension of at most 10 percent of an outer radial extension of the ring-shaped liquid retention element and/or of an outer radial extension of the ring-shaped susceptor element.

15. The inductive heating assembly according to claim 13, wherein the induction coil is a helical coil or a flat pancake coil.

* * * * *